United States Patent
Fazekas et al.

(10) Patent No.: US 9,403,134 B2
(45) Date of Patent: Aug. 2, 2016

(54) METHOD FOR PRODUCING A MATERIAL MIXTURE OF POWDER OR GRANULAR STATE MATERIAL AND LIQUID

(71) Applicant: GEA EGI Energiagazdálkodási Zrt., Budapest (HU)

(72) Inventors: Péter Fazekas, Budapest (HU); János Hangyál, Solymár (HU); József Ferenc Kiss, Budapest (HU); Gábor Kocsis, Budapest (HU)

(73) Assignee: GEA EGI Energiagazdalkodasi Zrt, Budapest (HU)

( * ) Notice: Subject to any disclaimer, the term of this patent is extended or adjusted under 35 U.S.C. 154(b) by 165 days.

(21) Appl. No.: 14/254,025

(22) Filed: Apr. 16, 2014

(65) Prior Publication Data
US 2015/0298076 A1    Oct. 22, 2015

(51) Int. Cl.
*B01F 15/02* (2006.01)
*B01F 5/00* (2006.01)
(Continued)

(52) U.S. Cl.
CPC ............... *B01F 5/10* (2013.01); *B01F 3/1214* (2013.01); *B01F 3/1228* (2013.01); *B01F 3/1271* (2013.01); *B01F 5/0065* (2013.01); *B01F 5/205* (2013.01); *B01F 15/00162* (2013.01); *B01F 15/0235* (2013.01); *G01F 23/161* (2013.01)

(58) Field of Classification Search
CPC .... B01F 15/00155; B01F 5/0065; B01F 5/10; B01F 5/205
USPC ................................................ 366/9, 32, 40
See application file for complete search history.

(56) References Cited

U.S. PATENT DOCUMENTS

| | | | | |
|---|---|---|---|---|
| 4,436,431 A | * | 3/1984 | Strong | B01F 15/00155 366/132 |
| 5,624,182 A | * | 4/1997 | Dearing, Sr. | B01F 15/00155 366/152.2 |
| 5,795,060 A | * | 8/1998 | Stephens | B01F 3/12 366/10 |

*Primary Examiner* — Tony G Soohoo
*Assistant Examiner* — Anshu Bhatia
(74) *Attorney, Agent, or Firm* — Wood, Herron & Evans, LLP (57) ABSTRACT

The invention is a method for producing a mixture of powder or granular state material and liquid, in the course of which a first mixture is produced by conveying the powder or granular state material through an inlet hopper into an upper mixing space and by feeding the liquid into the upper mixing space, the first mixture is introduced into a lower mixing space through a conducting pipe connecting a bottom part of the upper mixing space and an upper part of a lower mixing space having a cylindrical space portion and a conical space portion, and a second mixture is produced by causing it to collide into a baffle member, the second mixture is discharged through the conical space portion arranged at the bottom part of the lower mixing space. By dividing the second mixture, a first mixture portion is discharged as a mixture material, a second mixture portion is re-circulated into the upper mixing space, and a third mixture portion is conveyed into the upper part of the lower mixing space. The ratio of the first mixture portion to the second mixture portion is chosen to a value between 1:1 and 1:4, the ratio of the first mixture portion to the third mixture portion is chosen to a value between 1:1 and 1:5, and in the lower mixing space the amount of the second mixture is adjusted so that the surface of the second mixture is within the cylindrical space portion of the lower mixing space and is spaced from the baffle member.

11 Claims, 6 Drawing Sheets

(51) Int. Cl.
*B01F 5/10* (2006.01)
*B01F 15/00* (2006.01)
*B01F 3/12* (2006.01)
*B01F 5/20* (2006.01)
*G01F 23/16* (2006.01)

METHOD FOR PRODUCING A MATERIAL MIXTURE OF POWDER OR GRANULAR STATE MATERIAL AND LIQUID

TECHNICAL FIELD

The invention relates to a method for producing a mixture of powder or granular state material and liquid.

BACKGROUND ART

In the industry, there is frequent demand for producing a mixture of powder or granular state material and liquid. The mixing process must ensure hydration on the entire surface of large specific surface grains. In these applications, mixing with a liquid frequently causes the transformation of powder or granular state material as well, i.e. its chemical and physical characteristics are modified. The extent of mixing and thus that of the transformation are determined by the quantity of water added and by the technology applied for mixing.

At the mixing in these procedures, from the aspects of carrying the mixture through a pipeline, the specific water consumption and the transformation of powder or granular state material, it is usually advantageous if the powder or granular state material is mixed with a liquid of nearly identical amount as the weight of the material, thereby producing a mixture of high density, approx. 1/2-2/1 solid/liquid weight ratio.

Such an application is for example the producing of so-called dense slurry (also called as thick slurry) consisting of a solid phase combustion residue from a coal or petcoke fired power station and water at solid/liquid weight ratio of approx. 1/2-2/1, typically at 1.5-1 solid/liquid ratio. When producing dense slurry, it is important to ensure the mixing as good as possible, because it is desirable that particles of free calcium-oxide (CaO) content adhered to the fly ash grains, settled in the porous parts of the fly ash grains are fully dissolved. Through its so-called puzzolanic activity, the combustion residue of high specific surface would not or only slightly exhibit a cementing characteristic on its own, but in the presence of moisture and at a normal temperature, the materials of combustion residue enter into a chemical reaction with calcium-hydroxide ($Ca(OH)_2$) through mixing and due to this chemical reaction, they are converted to a solid structure material. Intensive mixing ensures a rapid reaction rate. In this way, the dense slurry becomes solid after being delivered along in a pipeline and after being disposed. As a result of appropriate mixing, after solidification, a high volumetric density, high compression strength and low water permeability deposit is created.

In case of dense slurry, the amount of water added to the solid material is significantly less than in the case of the lean slurry (also called as thin slurry). In this context, the chemical reactions of the solid material and the water play an essential role in case of dense slurry as compared to lean slurry.

If, by a method, dense slurry is produced as a material mixture, then various materials produced during the manufacturing processes can be distinguished, such as Product phase I—the material directly after mixing and delivery (transport), the dense slurry itself;
Product phase II—the deposited material after a few days of storage, after surface water has leaked/evaporated and cementation process has started;
Product phase III—the deposited material after longer storage (typically few months), after the process of cementation has practically been completed: deposit. (In the material certain additional mineral transformations may take longer).

The binding characteristics of the material basically depend on the mineral composition of the raw material used in the method as a base material, where relevant factors are the reactive (free) CaO/MgO content, and their proportion to the silicate/aluminate components. The binding characteristics furthermore depend on the mixing process itself, where the mixing ratio by weight (solid/water) and the intensity of mixing are also significant factors. The mixing water quality has also some relevance.

WO 98/08596 A1 describes an apparatus adapted for producing a mixture, e.g. dense slurry. The known apparatus comprises a mixing space, a hopper for introducing the powder or granular state material into the mixing space, an inlet pipe for introducing the liquid into the mixing space, a pipe for re-circulating a part of the mixture into the mixing space, and an outlet pipe for delivering the mixture.

In the known apparatus, an upper mixing space and a lower mixing space are arranged one below the other, which are connected to each other with a conducting pipe having a cross section narrower than that of the upper mixing space. The apparatus has a first circulating circuit for delivering one part of the mixture accumulated in the bottom part of the lower mixing space into the upper mixing space and a second circulating circuit for delivering another portion of the mixture accumulated in the bottom part of the lower mixing space into the upper part of the lower mixing space.

In the light of the known solutions, especially the apparatus described in WO 98/08596 A1 there is a need for a method for producing a mixture, especially a dense slurry, consisting of powder or granular state material and liquid, which production method with the help of the apparatus disclosed in WO 98/08596 A1 could produce a mixture of appropriate quality, free of excessive air content, and having a uniform quality.

DISCLOSURE OF THE INVENTION

The primary object of the invention is to provide a method which is free of disadvantages of prior art solutions to the greatest possible extent.

It is a further object of the invention to provide a method, by which an appropriately homogenous mixture, especially a dense slurry, can be produced, which does not comprise, or comprises only in a slight amount of undissolved calcium-oxide (CaO) particles, gas or air bubbles, and has no local chemical reactions taking place therein. Any such presence would cause the development of cracks and increase the water permeability of the deposit, thereby flushing detrimental materials out of the deposit and thus the deposit could become the source of environmental pollution.

The objects of the invention have been achieved by means of the method according to claim 1. Preferred embodiments of the invention are defined in the dependent claims.

BRIEF DESCRIPTION OF THE DRAWINGS

Preferred embodiments of the invention will be described by way of example with the accompanying drawings, in which.

MODES FOR CARRYING OUT THE INVENTION

Figure 1:
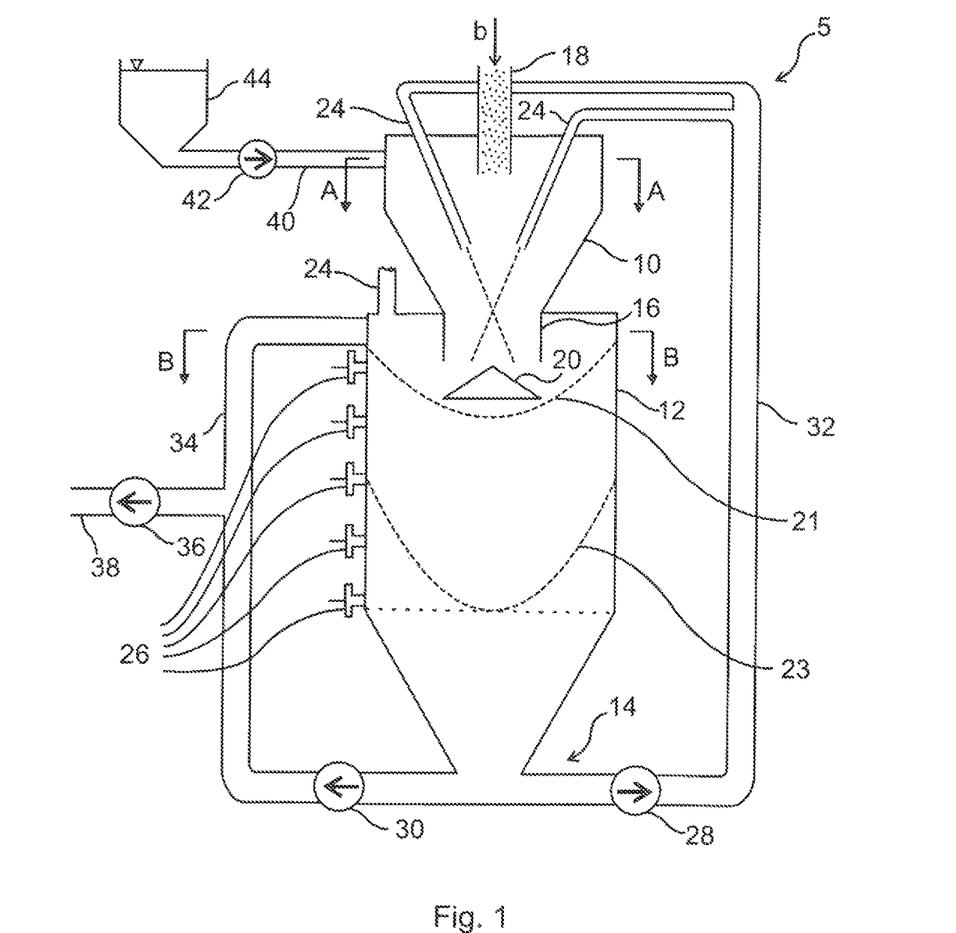
FIG. 1 is a schematic view of the apparatus used for the method according to the invention.

The method according to the invention, adapted for producing a mixture of powder or granular state material and liquid is presented with the help of the apparatus shown in FIG. 1. The configuration of the apparatus according to FIG. 1 is to a large extent similar to that described in WO 98/08596 A1; in the apparatus according to FIG. 1 pressure gauges 26 are arranged in instrument stubs on the sidewall of a lower mixing space 12.

In the method according to the invention, a first mixture is produced by introducing a powder or granular state material through an inlet hopper 18 into an upper mixing space 10 (also called as upper mixing head) and by feeding liquid into the upper mixing space 10, e.g. through a pipeline 40. Then, through a conducting pipe 16 connecting a bottom part of the upper mixing space 10 and an upper part of a lower mixing space 12 (also called as lower mixing head), the first mixture is introduced into the lower mixing space 12, and a second mixture is produced by causing it to collide into a baffle member 20. Then the second mixture is discharged through a conical space portion 14 arranged in the bottom part of the lower mixing space 12, and by dividing/separating the second mixture, a first mixture portion is discharged as a mixture material, a second mixture portion is re-circulated into the upper mixing space 10, and a third mixture portion is conveyed into the upper part of the lower mixing space 12. In the method according to the invention, the ratio of the first mixture portion and the second mixture portion is chosen to a value between 1:1 and 1:4, while the ratio of the first mixture portion and the third mixture portion is chosen to a value between 1:1 to 1:5, and in the lower mixing space the amount of the second mixture is adjusted so that the surface of the second mixture is spaced from the baffle member 16 and within the cylindrical space portion of the lower mixing space. In the method according to the invention, in order to ensure proper mixing, a larger portion is re-circulated, both into the upper mixing space and into the upper part of the lower mixing space, than the amount discharged. Use of a ratio higher than 1:4 or 1:5 is uneconomical due to the required large energy input.

FIG. 1 illustrates an approximate maximum level 21 and approximate minimum level 23 of the second mixture being in the lower mixing space 12 in the course of the method according to the invention. It is shown in FIG. 1 that the surface of the second mixture may extend above the baffle member 20 due to the parabolic shape caused by the rotational movement thereof, nevertheless, parts of the parabolic shape below the baffle member 20 are to be ensured to be located with a distance, i.e. spaced from the baffle member 20. Level 23 illustrates that the lowest point of a possibly steep parabola may touch the conical space portion from above, however, in the lower mixing space the lowest point of the second mixture may not be lower than that. Of course, it may occur that the surface of the second mixture is a parabola of less steep elevation. In the method according to the invention, it must be ensured that no part of the surface is within the conical space portion.

In an embodiment of the invention, the ratio of the first mixture portion and the second mixture portion is chosen to a value between 1:1.5 and 1:3, and the ratio of the first mixture portion and the third mixture portion is chosen to a value between 1:2 and 1:4. Our experiments have shown that the mixing is best in such cases where the ratios are chosen in the above ranges. The approximate 1:2 ratio of the first mixture portion and the second mixture portion is especially preferable, and the approximate 1:3 ratio of the first mixture portion and the third mixture portion is especially preferable, such ratios providing optimal mixing and mixture material output. According to the invention, it has been recognized that the surface of the second mixture in the lower mixing space assumes the shape of a parabolic rotational surface due to the component re-introduced through the pipeline 34 as well. In the case of high intensity mixing, the slope of this parabola can also be high. Due to the parabolic surface, a conventional level control cannot be provided in the lower mixing space, but in order to ensure the continuous flow, application of special level control is necessary.

In order to provide a proper drainage in the mixing apparatus, the bottom part of the lower mixing space has a conical configuration. It has been recognized that in order to provide an end product of an appropriate quality, the surface of the second mixture should be avoided to fall within this conical space portion. It is preferred to keep the level (each point thereof, i.e. each point of the rotational surface of the parabola, thus its lowest point as well) in the cylindrical space portion of the lower mixing space for two reasons. On the one hand, if the surface protrudes into the conical space portion, then, due to the accelerating flow of the material being drained, it may cause sucking air from the lower mixing space. If in this way air gets into the mixture, it may disturb the circulation, smooth operation and delivery, which result an end product of a lower quality.

In consequence of the strong dynamic effects due to the narrower part inside the conical space portion, level measurement could not be carried out on the basis of conventional pressure measurement either. The shape of the parabola extending into the conical space portion is deformed to such an extent that it would be impossible as well to determinate the real level, e.g. the lowest point of the surface with appropriate accuracy. Therefore, pressure gauges 26 according to FIG. 1, preferably fitted with rubber covers, are arranged in the sidewall of the cylindrical space portion and there is no pressure gauge arranged in the conical space portion. Accordingly, if the surface of the second mixture protruded into the conical space portion, the method for producing the mixture would become uncontrolled, and it would be impossible to determine the level by means of the pressure gauge located in the sidewall of the cylindrical space portion with appropriate reliability, therefore the quality of the discharge mixture could deteriorate and smooth operation would not be possible.

The pressure gauge 26, if there are several pressure gauges, the lowest one, is arranged in the sidewall of the cylindrical space portion above the conical space portion preferably at a maximum of 150 mm. Preferably, for a more precise determination of the level, several pressure gauges 26 may be arranged in the sidewall of the cylindrical space portion, however, the use of lowest pressure gauge is sufficient for the proper operation of the method according to the invention.

In an embodiment of the method according to the invention, the surface of the second mixture is determined by means of at least one pressure gauge arranged in the sidewall of the cylindrical space portion. The pressure gauge allows determination of the amount of material present inside the cylindrical portion of the lower mixing space, and based on this information and with the help of the inlet data, the shape of the surface of the second mixture, and thereby the position of the lowest point of the surface can be calculated with a good accuracy.

The surface of the second mixture occupies a position which has a distance from the baffle member 20, i.e. is spaced from the baffle member. This must be provided in the method according to the invention, because if the surface should reach the baffle member 20, then its functionality would greatly deteriorate, drastically impairing the efficiency of baffling. Namely, in this case instead of causing the material arriving from above to "splash apart" i.e. to get onto the walls, it would simply flow down from the baffle member 20.

Figure 2:
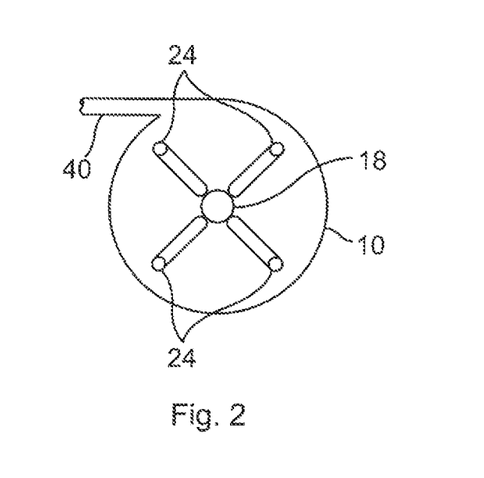
FIG. 2 is a cross sectional view of the apparatus of FIG. 1 taken along the plane A-A, facing the direction of the arrows.

In a manner as shown in FIG. 2, the end of the pipeline 32 protruding into the upper mixing space 10 is divided into four nozzles 24 (jet pipes) ejecting the second mixture, said nozzles being located symmetrically to the axis of the upper mixing space 10 such that their mixture jets are directed toward the space confined by the conducting pipe 16 as illustrated in FIG. 1. This nozzle arrangement surrounds the powder or granular state material flowing in through the hopper 18. Thus, in the upper mixing space 10, a high intensity mixing of the mixture jets arriving with a high kinetic energy through the nozzles 24, preferably having a speed of 5-8 m/s, of the liquid of an amount accurately determined for mixing and coming in through the inlet pipe 40 and of the gravitationally entering solid phase is achieved.

The amount of the mixture delivered by a first circulating pump 28 in the first circulation circuit is preferably selected such that the mixture jets fill the entire cross-section of the conducting pipe 16. In this manner, a suction effect is achieved by means of the mixture jets in the upper mixing space 10 to facilitate that the floating powder particles precipitating from the powder or granular state particles move in the direction of the mixture jets and thereby mix with the mixture flow.

In the upper mixing space 10 a suction of such extent must be generated which directs to the mixture jets the powder particles remaining floating after the collision of the circulated mixture jets and the bulk powder or granular state material. An appropriate suction effect is accomplished if in the depicted preferred embodiment if in the conducting pipe 16 the flow rate of the mixture is between 6 and 8 m/s. Without a suction effect, the floating powder particles not mixing with the mixture jets stick to the inner surface of the mixing apparatus, thereby gradually blocking the air space and the hopper 18 leading to the mixing space 10. In the depicted embodiment, the suction effect is also facilitated by the mixing space 10 having a downward narrowing funnel shape. The suction effect so generated keeps the air space of the funnel-shaped mixing space 10, the hopper 18 ending in the air space and the inlet pipe 40 under suction.

In the mixing space 10 a very good mixing can be achieved as a result of the baffling and the suction. However, the baffled mixture flowing through the conducting pipe 16 still has a significant amount of kinetic energy, which could be utilized in order to ensure a better mixing and for removing the gas and air from the mixture. This kinetic energy is utilized in the lower mixing space 12 having a gravitational air space below the conducting pipe 16, in a way that the mixture flowing downwards through the conducting pipe 16 is caused to collide with the surface of the baffle member 20, so that it loses its kinetic energy in the course of intensive mixing, being splashed apart in the upper part of the mixing space 12, and reaching the lower mixing space 12 by gravitational flow.

Figure 3:
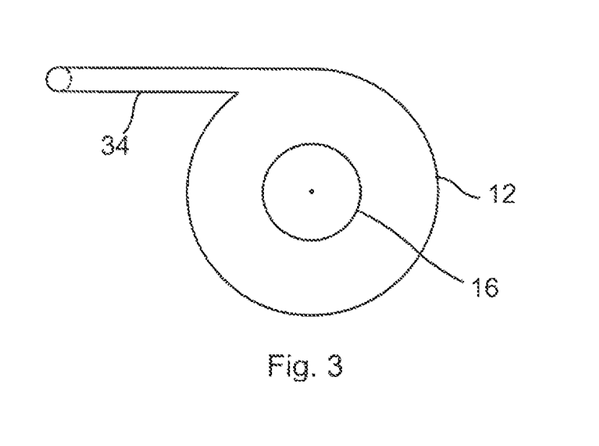
FIG. 3 is a cross sectional view of the apparatus of FIG. 1 taken along the plane B-B, facing the direction of the arrows.

The pipeline 34 is preferably introduced in an approximately tangential direction into the upper part of the lower mixing space 12, as shown in FIG. 3. The mixture flow introduced in a tangential direction facilitates the break apart of larger grains, and as a result of the thereby generated centrifugal force, the gas and air bubbles escape from the mixture. The speed of the mixture introduced from the pipeline 34 is preferably 5-8 m/s. To this end, of course it is necessary to utilize the gravitational field and to remove escaping gases and/or air from the mixing space. In a further embodiment, the liquid is also introduced into the upper mixing space in an approximately tangential direction.

Figure 4:
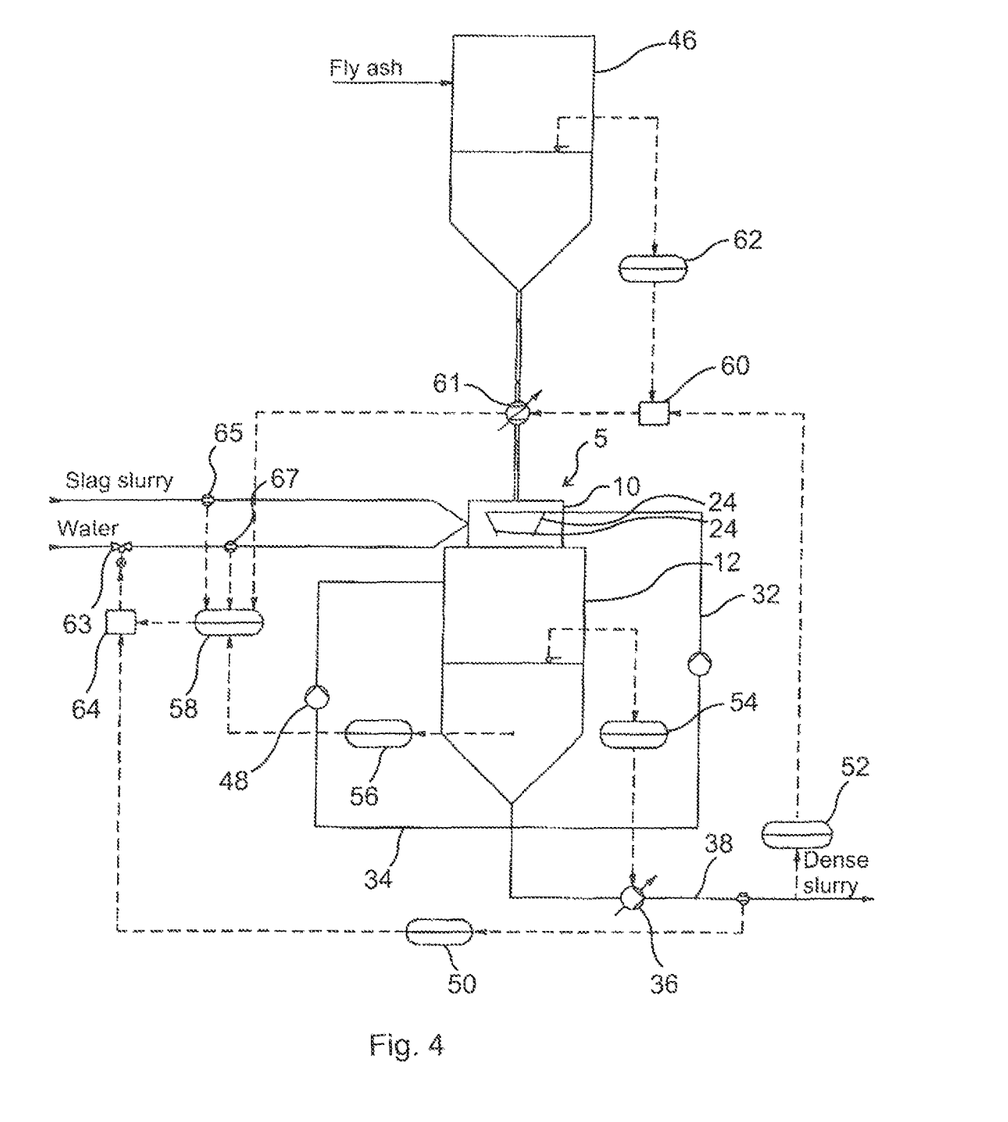
FIG. 4 is a control diagram illustrating an embodiment of the invention.

In FIG. 4 an embodiment of the method according to the invention is shown. In this embodiment, the lower mixing space 12 is typically formed in a cylindrical container having a conical lower part. The upper mixing space 10 is mounted onto the top of this container. In the present embodiment of the method, in a manner as shown in FIG. 4, fly ash fed from a fly ash silo 46 is mixed in a controlled manner with the required amount of water in the upper mixing space 10. FIG. 4 illustrates a number of control modules 50, 52, 54, 56, 58, 62 controlling, in a harmonized manner, the required amounts of fly ash, slag and water to be added.

The amount of added water is controlled by means of a valve 63. The amount of water to be added can be maximized by means of the valve 63. Inputs of module 64 in charge of maximization are provided by control modules 50 and 58. The control module 50 measures the amount of delivered mixture, while the control module 58 receives as input the amount of the second mixture in the lower mixing space 12 from control module 56 and the amount of fly ash added into a mixing apparatus 5 from a setting module 61 controlling it. The control module 58 furthermore receives as input the amount of slag slurry and water getting into the upper mixing space 10 from pumps 63 and 65 in charge of transmitting the slag slurry and water. Therefore, the module 64 determines the maximum required inlet of water flow. The water content of slag slurry is to be added to the amount of the mixing water.

In this embodiment, therefore, the powder or granular state material is fly ash. The fly ash, yet in a dry state, enters the mixing space 10 via hopper 18 formed on the cover plate of the mixing space 10.

The amount of added fly ash can be regulated by means of a setting module 61, which is controlled by a module 60 based on its inputs. The inputs of module 60 are provided by control modules 62 and 52, namely, the level of material in the fly ash silo and the amount of delivered mixture are made available to module 60.

A pump 36 delivering the mixture can be controlled by means of control module 54. The input of the control module 54 is the liquid level measured in the lower mixing space 12.

The fly ash introduced into the upper mixing space 10 from the fly ash silo 46 is also wetted by the liquid conveyed through nozzles 24, said liquid being a pre-mixed slurry comprising solid material in accordance with FIG. 1 and is transmitted through pipeline 32 to the nozzles 24. The high speed jets arriving through nozzles 24 mix in with the dry fly ash from various directions, and smash any possibly forming larger clumps, so-called plugs.

The lower part of the upper mixing space 10 conically narrows, as a result of which the water jets within the conducting pipe 16 exert some injector effect. In this manner, the mixing head operates under depression, which prevents dusting.

Typically, the lower mixing space 12 is a cylindrical vessel significantly larger in diameter than that of the upper mixing space 10, into which the first mixture, the slurry arriving from the upper mixing space 10, flows from above. The vertically falling mixture collides into the baffle member 20, which is e.g. configured as a conical plate. The first mixture is spread by the baffle member as a thin film due to its liquid content. The produced film-like layer of liquid flows down within the lower mixing space 12 upon colliding into the cylindrical wall of the lower mixing space 12.

On the upper part of the container, there are located pipe stubs, e.g. the stub of the pipeline 34, which enable re-circulation of the second mixture. The third mixture portion of the second mixture re-directed preferably in a tangential direction spirals downwardly on the inner surface of the mantle of the container of the lower mixing space 12. In mixing space 12, it mixes with the material arriving from the upper mixing space 10, and this mixed material is accumulated in the lower part of the mixing space 12.

At the bottom of the container, there is preferably a conical drain hopper. The conical shape prevents formation of dead spaces. The drain hopper may be formed of a plurality of stubs, through which the second mixture flows to pumps 28, 30.

Pump 28 facilitates the so-called pre-mixing, namely by feeding the nozzles arranged in the mixing space 10. The pump 30 re-circulates the second mixture into the lower mixing space 12, and feeds pipeline 38, through which the first mixture portion of the second mixture is discharged, i.e. by way of an example it is transmitted to a landfill area (depository). Accordingly, an output pump 36 may be connected to the pressure side of pump 30 or directly to the mixing space 12 to convey the finished material.

In order to avoid dust formation, the lower mixing space 12 is preferably kept under a light vacuum, as it is advantageous in terms of de-aerating the second mixture (e.g. slurry) and preventing foam formation. The depression, preferably 1-2 mbar, as well as the removal of air arriving together with the fly ash is ensured by an air pump which is connected via an air filter to a stub 24 formed on the upper side of the lower mixing space 12.

By way of example, the pumps 28, 30, 36 may be so-called centrifugal slurry pumps, if the distance of transmission is not too long, or piston pumps in case of considerable distances and if a high starting pressure is required.

The apparatus suitable for producing the mixture may comprise auxiliary apparatuses as follows:
- a water tank and pumps for washing the apparatus and belonging pipelines in case of malfunction, and for the periodic water-injection of idle pipe sections;
- a slurry and water sump pump;
- an elevated fly ash silo with speed control feeder;
- local and remote instruments, for e.g. slurry level, water and slurry amount, slurry viscosity/consistency, pump pressure, etc. measurements, remote measurements for continuous and sequential process control;
- electric power transmission devices;
- steel structure and cover against weather, if the apparatus is not installed into an existing building.

By means of the method according to the invention, the operation of the known hydromechanical mixing apparatus provides for the processing of combustion residues from coal and petroleum coke fired furnaces (slag, Class F type fly ash and Class C type fly ash according to U.S. standards), as well as of flue-gas desulfurization gypsum as powders or granular materials. Available waters (raw water, industrial water, desulfurization waste water) are used as a liquid. According to technological recipes that are dependent on the quality of solid materials and liquid-types, a disposable dense slurry can be produced by a mixing ratio by weight ranging between 1/2 to 2/1, preferably between 1/1 and 1.5/1 (solid/liquid).

The hydromechanical mixing apparatus used by the method according to the invention is operational at an output performance of 60-100% in continuous operation mode without the adhesion of particles, i.e. without the danger of plugging.

Alkalization required for the puzzolanic bond of dense slurry of U.S. standard Class F fly ash can be achieved by means of a $Ca(OH)_2$ dissolving and dispensing system mountable onto the hydromechanical mixing apparatus.

If, due to fly ash sale to the construction industry, only such an amount of fly ash is available that can be mixed with the waste water of a desulfurization plant into dense slurry and can be deposited, then chemicals ($Ca(OH)_2$ and $Fe_2O_3$ solutions) may become necessary to be added for binding the chloride ions by means of a dissolving and dispensing system connectable to the mixing apparatus.

In the method for producing a mixture according to the invention, the material (powder or granular state material) to be mixed is preferably bondable dry fly ash in as high a ratio as possible but in a minimum of 70 wt %. Any other combustion residues introduced wetted or in the form of slurry, e.g. wet slag and washed wet coarse fly ash only can be considered as inert materials in terms of binding ability, because their surface layers as glassily melted granules remain insoluble even in alkaline medium. Therefore, the presence of the aforementioned wet materials is disadvantageous, because in the case of a deposit produced from the mixture according to the invention it should be necessary that the end product be a material which is capable of binding.

In many cases, the initial materials can pass through a lean slurry system. If such a slurry system operates with high amounts of transport water, then prior to mixing in the initial materials, such as fly ash, their water content is preferably decreased by means of a settler or a concentrator below the water quantity (dry/liquid ratio 1/3) required for the mixing process.

Feeding of the wet raw materials may be completed in two ways.

The wet materials (slag, coarse fly ash, desulfurization gypsum) are fed directly into the mixing apparatus in an uncontrolled, unlimited manner. Of course, the total amount to be fed is limited from above, and the homogeneity of the mixed material is to be kept at the appropriate level. Feeding is done either continuously (e.g. slag slurry) or periodically (e.g. desulfurization gypsum slurry).

The wet material is conveyed as liquid into the mixing apparatus in an unlimited and uncontrolled manner up to 30 wt % of the total solid material.

Inert materials—e.g. slag—are advantageously fed into the mixing apparatus in compliance with the following criteria:

Maximum particle size of 25 mm, in case of a centrifugal output pump. In case of a raw material of larger particle size, a slag crusher is to be installed after the firing rake recovering the slag.

If the mixture is conveyed by means of a membrane pump, an additional so-called secondary crusher is to be installed. In this case, the maximum particle size is 2.5 mm. Membrane pumps may be used for various reasons, such as for increased distance from the landfill area, i.e. the distance the mixture needs to be conveyed. The secondary crusher is to be installed before the solid material inlet point. The use of a maximum particle size of 2.5 mm is required due to constructional reasons. On the one hand, smooth operation is to be ensured for the spring closure valves entering the membrane space, while on the other hand particle acceleration in the membrane space, in case of particles larger than the threshold size, due to the so-called slug effect, may cause damages to the membrane and make replacement thereof necessary.

The amount of the inert material is preferably proportional to the amount of introduced fly ash, the maximum amount of inert materials ranging up to 30-70 wt % of the amount of fly ash.

If a process control computer is in charge of regulating the mix ratio, the solid material content and water content of slag slurry should be calculated in the additional solid material content and in the additional liquid content.

Figure 5:
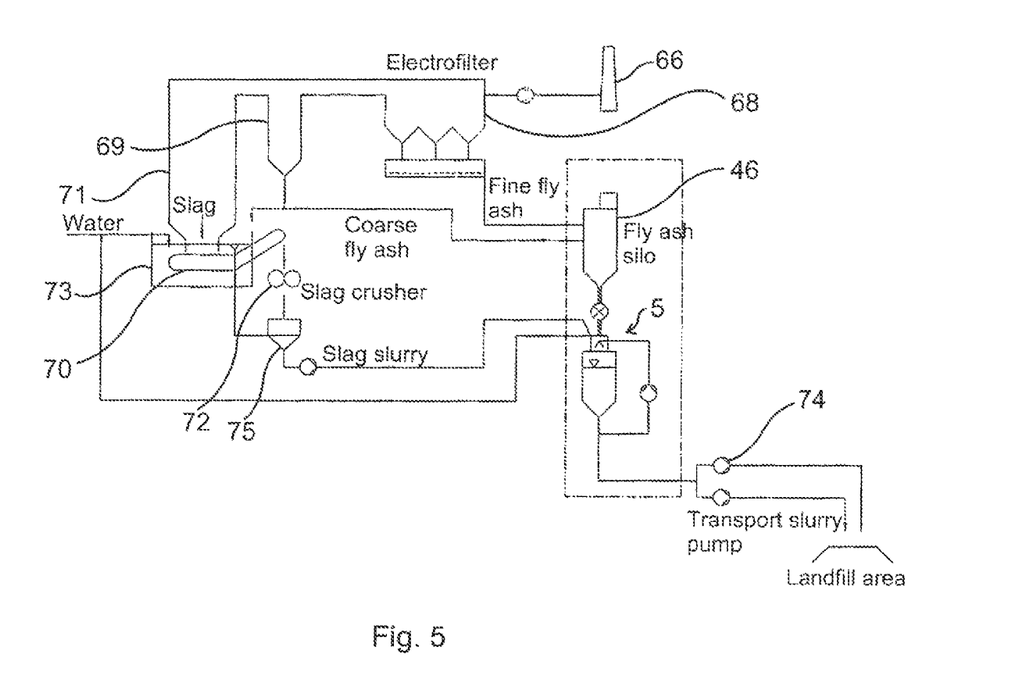
FIG. 5 is a schematic view of a further embodiment of the invention.

FIG. 5 illustrates the above. In the figure a furnace 66 outputting the combustion residue used in the method according to the invention is shown. This material is conveyed into filter 68, e.g. an electrofilter, separating fine fly ash from coarse fly ash and slag. Fine fly ash is then conveyed from the electrofilter 68 into the fly ash silo 46, from where it can be fed into the mixing apparatus 5, the use of which enables the process according to the invention to take place. The coarse fly ash is delivered through a module 69 partly onto a conveyor belt 70 and partly, in accordance with the appropriate proportion, into the fly ash silo 46, as well. The slag moves through module 71 into a container 73 typically comprising water. From the container 73 firing rake conveyor belt 71 transports the dry material content and feeds it to a slag crusher 72, which is preferably fitted with crushing rollers. The material outputted from the slag crusher moves into a tank 75 to mix with water, forming so-called slag slurry. The water of the tank 75 preferably comes from container 73; the tank 75 is preferably connected to the overflow of container 73. The slag slurry is transported by means of a pump to the mixing apparatus 5 and is introduced into the upper mixing space 10. The pipeline delivering the slag slurry is connected to the upper mixing space 10 in a manner similar to pipe 40 according to FIG. 1. FIG. 5 illustrates that the container 73 and the upper mixing space 10 are preferably provided with water from the same container. The production as illustrated in FIG. 5 ensures that mixing apparatus 5 is fed by a dry material of appropriate particle size, namely ensuring appropriate initial materials for the process according to the invention.

FIG. 5 shows the pipeline re-circulating the second mixture from the lower mixing space 12 into the upper mixing space 10 as well as the pipeline discharging the mixture. Furthermore, in FIG. 5 the landfill area is also shown, where the mixture is conveyed through pipelines by means of pumps 74.

In coal-fired power stations, flue gas desulfurization apparatuses are often used to decrease environmental pollution. Most of these technologies are based on the fact that the sulfur-dioxide content of flue gases can be bound by calcium compounds, such binding reactions producing an end product of calcium-sulfite or calcium-sulfate (gypsum).

The most frequently used desulfurization process is the so-called wet technology providing a very high efficiency of over 90%. The application of wet technologies typically results in two different types of waste products:

gypsum with a moisture content of 10-20% having been led through a vacuum filter, slightly polluted by other materials (e.g. powdered coal) flowing in the flue gas, and washing water comprising a high concentrate of chlorides (20,000-80,000 mg/l), Ca and Mg ions (1,100-4,000 mg/l), $SO_4$ (approx. 1,500 mg/l) and heavy metals Cd, Hg, Ni, Pb, Zu, Solemin (a total of approx. 50 mg/l), as well as other compounds.

The slag, fly ash and gypsum ratio may vary, being influenced also by the fly ash content and sulfur content of the coal used for firing. Typically, the amount of gypsum is one-fourth to one-fifth of the total amount of slag and fly ash.

The gypsum, which preferably does not bind and having a moisture content of 10-20% is stored in large silos, deposit containers at the power station site. Occasionally it may be sold as construction material, often it requires permanent deposit. For such deposit, the same slurry space (landfill area) can be used where slag and fly ash are deposited. Wastewater of the washer is collected into containers. In principle there is the option of purification, nevertheless it incurs significantly less costs to deposit, i.e. to place into containers. Preferably, by diluting gypsum with water (gypsum slurry), it may be fed into the mixing apparatus in the same manner as the slag arriving from the furnace space.

A low ratio of gypsum is not harmful, but rather it improves the solidity as well as other characteristics of the deposited mixture. Therefore, the maximum gypsum content of powder or granular state material is preferably 20 wt %, as a higher ratio would decrease the quality of the deposit.

In our tests, we have experienced that while the use of waste water of various sources as opposed to clear water increased solidification time, it could nonetheless improve the major characteristics of the solidified deposit. By way of example, desulfurization waste water, in consequence of the concentrated presence of Ca ion in the mixture, first causes gypsification to take place, which dissociates, forming a so-called ettringite mineral structure.

Our experiments so far have proven that mixing waste material of other semi-dry or dry ($CaSO_3*2H_2O$) technologies to the mixture is not disadvantageous either. Large scale industrial experiments have been completed with bottom ash from circulating fluid and hybrid fluid furnaces, in which, in accordance with the character of the technology, limestone was fed into the furnace in addition to coal. We have found that the limestone additive has increased the free calcium-oxide content of the bottom ash, and thus favorably influenced the physical parameters of the dense slurry deposit.

In the case of a scheduled stop of the furnace providing the raw material, initial input material or in any other cases when the operating mixing apparatus is stopped together with the long-distance pipeline, washing of the long-distance pipeline is completed together with washing of the mixing apparatus. At this point, after fly ash feeding has ceased, water is provided in an amount required for washing in the mixing apparatus from the mixing water pipe, the mixing apparatus is operated in a way as detailed here above in a manner similar to the method according to the invention, and the washing water is discharged by the output pump. Thus, the output pump forwards a gradually attenuating slurry, then raw water, through the long-distance pipeline. In such a case, the re-circulating pumps 28, 30 are also in operation; therefore these pumps together with their respective pipelines are also being washed.

It is a basic criterion in determining the amount of water required for the washing procedure that the washing water should move along the long-distance pipeline having the same intensity as the dense slurry (mixture material) output, however, due to safety reasons it is advisable to use an amount of washing water which exceeds the volume of the long-distance pipeline. On the basis of practical experiences, the amount of washing water (VMV) approximately equals 1.5 times the volume of the long distance pipeline (VTV).

$$VMV = 1.5 VTV$$

Accordingly, the transport capacity of the output pump determines the required wash time.

In cases when the long-distance pipeline has non-uniform inclination, the long-distance pipeline needs to be emptied at the deep points after the washing. Additional steps should be taken in accordance with the regulations effective in regard to water conveyance long-distance pipelines.

If a dry, solid material with a mass flow rate of DSF [t/h] characterized by a density of DSO [t/m$^3$] is mixed perfectly with water (DSW=1 t/m$^3$) in a given solid/liquid ratio (RM), then the produced slurry mixture can be characterized as follows:

Density: DSL[t/m$^3$], where DSL=(RM+1)/(RM/DSO+1)
Volume Flow Rate: VSL [m$^3$/h], where VSL=(1/RM+1/DSO)*DSF
Mass Flow Rate: MSL [t/h], where MSL=(1/RM+1)*DSF
Required mixing water flow: VMW [m$^3$/h], where VMW=(1/RM)*DSF The density of the solid material is to be understood as the density of a tight material, and not as the density of a set also containing air. In practice, the density of a solid material can be measured by adding 1 kg of water to 1 kg of dry material and after a thorough mixing, the volume of the mixture is determined. Density can be inferred from the increase of the volume of the liquid:

DSO=1/(VSL−1).

Typical data for fly ash and slag: DSO=1.9-2.4 t/m$^3$.

Practically, the mixture may contain air bubbles as well, whereby its density is slightly lower than that of a model of perfect mixing. This can be expressed with an index (PSL) indicating the porosity of the product, where PSL=(Porous volume−calculated volume)/porous volume=(VSP−VSL)/VSP.

In light of this, the density of the porous material should be corrected accordingly.

The input data may be defined other than as above (e.g. density of solid material is given as density of a set) or the input mass flow rate of the raw material relates to a wet material instead of a dry material (e.g. wet slag after the slag outlet conveyor), which must be taken into consideration in the calculations.

An important feature of the product of the mixing process, i.e. the mixture, is its consistency, which can be measured and characterized in a manner similar to viscosity.

Dynamic viscosity relating to a given material strongly depends on the density, while it still changes during its residence in the mixer.

The dimension of dynamic viscosity η is Pa*s, kinematic viscosity is ν=η/ρ, here ρ is the density [kg/m$^3$]; the dimension of kinematic viscosity is [m$^2$/s]. A typical value for dense slurry is ρ≈1400 kg/m$^3$, η=0.3 Pa*s, ν≈2 m$^2$/s.

Mixing can be regarded to be completed, when the quality characteristics specified for the product have been reached and the parameters became permanent. The following factors may be of importance:
density,
viscosity/consistency,
temperature,
pH.

The residence time required for attaining the specified parameters in the case of dense slurry mixing depends on the chemical composition of the raw material. The practical value for low free CaO, MgO and SO$_3$ content fly ash, wherein the temperature rise is negligible, ranges between 3 to 5 minutes. In case of high free CaO content materials, longer residence time and more significant temperature rise are to be considered, partly in the mixer and in the long-distance slurry pipeline, and partly at the landfill area and in the presence of other components capable of hydration mentioned above, mineralization of the dense slurry will start already in the mixing apparatus, which is an exothermic process as well. Residence time is a time interval during which a solid particle resides in the mixing process. Residence time (TMD) is defined as follows:

TMD=VM/VSL, where VM is the net mixer volume at normal slurry level.

Figure 6:
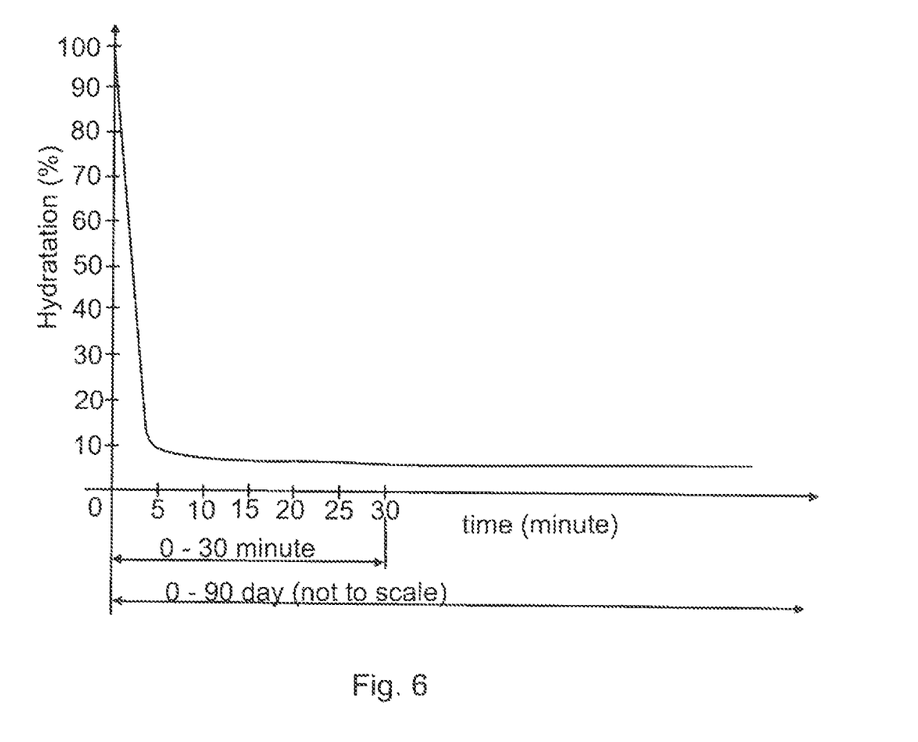
FIG. 6 is a graph illustrating the efficiency of the method according to the invention.

FIG. 6 shows a hydration diagram of Class C fly ash. It is shown in the diagram that hydration takes place in a very rapid manner when using the method according to the invention, hydration reaches the appropriate value after 30 minutes, thereafter hydration rate will no longer change essentially. This hydration may take place in the mixer, in the long-distance pipeline and/or at the landfill area.

Hydration continues at the landfill area, and mineralization of calcium silicate and calcium aluminate silicate begins, hydrated CSH and CASH form providing continuous heat development for 80 to 90 days, as illustrated in FIG. 6.

According to the invention, the pressure gauges measuring the position of the surface of the second mixture are preferably membrane pressure transmitters. Membrane pressure sensor heads are preferably encased in rubber sleeve for protection against abrasion (filled with instrument oil between the sleeve and the membrane sensor) and preferably are positioned such that the slurry flow should not collide into the sensor surfaces. The pressure gauge membranes are made abrasion resistant by means of rubber sleeves or rubber caps.

For level measurement in the lower mixing space of the mixing apparatus, the process of indirect pressure/density measurement can be used as described here below. From the pressure value taken in the given measurement point, the process control computer will generate the height of the level above the measurement point based on the relationship of h=pressure/density. The flow rate can be measured by an abrasion resistant induction flow meter. Density is determined from the pressure difference, which can be calculated from the signal of the membrane (rubber sleeve) pressure difference sensors placed at the inlet and outlet points of the 1 m length calibrated internal dimension macro section built into the vertical section of the re-circulating pipeline (pipeline 32). Slurry density is determined by a computer on the basis of offset difference and the slurry flow rate, in a manner known per se.

Measurement instruments used in the chemical industry (e.g. paint consistency) can be used as viscosity/consistency meters.

The mixing process is controlled by the process control computer being part of the mixing apparatus with functions such as regulation, control, display, and intervention. In addition to controlling the mixing process, the process control computer may control the processes of slag/fly ash collection, storage, delivery.

A relevant controlled variable of the mixing apparatus is the solid/liquid ratio, where the amount of solid material is a data calculated from the rotational speed of the dispenser, and the amount of water is a measured value including the water content of added other wastes (e.g. slag, or slag slurry). Further controlled variables may include slurry density and mixture consistency (viscosity) or a measurable physical parameter proportional thereto, such as the power consumption of the re-circulating pump. The relationships of the controlled variables as detailed above are illustrated in FIG. 4.

The threshold parameter included in the regulation is the minimum value of the delivered dense slurry, the appropriate choice of which can prevent low slurry speed resulting in particle separation and plugging of the pipeline. The amount of the mixing water is regulated by means of the mixing water regulator valve in a manner as detailed in connection with FIG. 4.

Although the rate of re-circulation in the mixing apparatus (the rate of re-circulation into the upper mixing space and into the upper part of the lower mixing space) is important planning data, continuous regulation of the re-circulation is not required. Nevertheless, at low load, re-circulation can be decreased by speed/frequency regulation in order to save energy. However, only to a limited extent, because the output speed of the nozzle ensuring mixing must not fall below 5 m/s and the flow speed in the pipe system of the mixing apparatus must not fall below 1.2 m/sec so as to prevent settlement of larger size particles.

Mixing capacity is determined by the mass flow of inlet solid material, which depends on site/furnace load. Preferably, the fly ash is stored in a silo prior to entering the upper mixing space to provide an averaging time required for proper regulation. It is also preferred to have a built-in storage capacity for other combustion residues, such as wet slag, although these can be omitted in consideration of their low ratio of maximum 30% as compared to fly ash.

Capacity regulation may be carried out by maintaining the level in the fly ash silo at a constant value. In this case, the mixing capacity will essentially automatically follow the capacity of the furnace providing the fly ash.

As a controlled variable, the level (preferably its time average) of the fly ash silo is chosen in this case. As an intervention, the outlet feeder speed of the silo can be controlled, namely we can intervene by controlling the setting module 61 in charge of regulating the fly ash amount. (cf. FIG. 4)

A threshold parameter is included in the regulation: dense slurry pressure in the delivery pipe (to limit the top of the mixing capacity). If the mixing capacity is too high, it is possible to effect for example: a switch to a reserve pipeline, a short-term outlet pump shutdown on an operating pipeline, or a short-term fly ash rotary feeder shutdown.

Capacity tracking may temporarily be overruled by other aspects, so as to make use of the storage capacity of the fly ash silo.

The balance between the amounts of inlet solid material and mixing water and the amount of outlet dense slurry may be ensured by maintaining the liquid level of the mixing vessel at a constant value. This can also be achieved by changing the amount of outlet dense slurry via the speed/frequency regulation of the outlet pump.

The controlled variable, therefore, is the level of material measurable in the mixing container (in the lower mixing space). As an intervention, the rotational speed of the outlet pump can be changed.

Preferably, in the method according to the invention, various protections, blockings may also be used as follows.

If in the discharge pipeline, the speed falls below a given minimum value (1.5 m/s-2 m/s), the amount of water to be mixed in is to be increased by increasing the reference input of mixing quality regulation.

If the initial pressure of the discharge pipeline increases above the given maximum value (approx. 1.3 times the operating pressure), the entered fly ash amount is preferably to be decreased.

If the level of the fly ash silo located before the mixing apparatus falls to the minimum value, the mixing apparatus stops, the washing program starts, and the discharge stops.

If in the mixer, the liquid level falls to the minimum value (such that the surface of the second mixture touches the bottom of the cylindrical part of the lower mixing space), first the auxiliary water inlet is to be increased (by overriding the quality regulation), then if unsuccessful, fly ash/slag input is to be stopped, in turn washing program starts, then the discharge stops.

If in the mixer, the liquid level rises to the maximum value (the surface would touch the baffle member), first the output capacity of the discharge is to be increased to the maximum value, then if unsuccessful, fly ash inlet is to be stopped, and auxiliary water inlet is to be decreased, and finally the mixing apparatus is to be stopped.

If in the mixing apparatus, the density/pressure value rises to the maximum value (1.2 times the operating pressure), fly ash input is to be stopped, while increasing auxiliary water input (by overriding quality regulation)

During continuous operation of the mixing apparatus, the mixture resides in the mixing apparatus, or takes part in the mixing processes (re-circulation, nozzle acceleration and collision, ejection effect centrifugal spiral travel in the container portion). As a result of this, a significant rate of hydration of the components takes place already inside the apparatus or within the long-distance pipeline.

|  | Within 5 minutes (%) | Within 30 minutes |
|---|---|---|
| CaSO4 anhydride | 100 | decrease to 60% |
| free lime CaO transforms into portlandite | 92 | decrease to 20% |
| ettringite formation | 12 | increase to 21% |

The above results are illustrations for the efficiency of the mixing. Despite the short mixing and discharge time, the lime hydration required for mineral formation is basically ensured already at the landfill area at the end of the slurry output pipe.

The mixing process and hydration of the solid particles continues to take place in the pipeline in consequence of the high speed flow rate (2-2.5 m/s) of the mixture.

In the following, the mechanism of chloride binding in the mixture is described. Chloride ions ($CaCl_2$ or $MgCl_2$) transported into the dense slurry together with FGD (flue gas desulfurization) waste water as mixing water, similarly to mineral structures containing cement, are bound by the fly ash $C_3A$ (where $C_3A = 3CaO * Al_2O_3 * 10H_2O$) content in alkaline medium, forming $C_3A * CaCl_2 * H_{10}$ (Friedel's salt).

Class F fly ash has no free CaO, and FGD waste water only has a total of 1-2 wt %, therefore the mixing of dense slurry (mixture) is preferably carried out by dispensing the required amount of lime hydrate or lime. The rate of dispensing should be determined based on a previous mineral calculation, then by test mixing.

In fly ash, the active aluminum and silicate minerals being in a glassy phase (due to rapid melting and solidification) react in $Ca(OH)_2$ medium, then reaching a gel phase they form into calcium-aluminate hydrate and calcium-silicate hydrate minerals of various saturation, at the same time binding the calcium and magnesium chlorides.

The puzzolanic activity of a given fly ash corresponding to the above can be determined by a lime binding process, i.e. by measuring the CaO amount that can be bound by 1 gram of fly ash at 28 days of its age in saturated calcareous medium.

The binding of Cl residing in FGD waste water ($CaCl_2$, $MgCl_2$) into mineral structure takes place as follows.

Technology: mixing Class F fly ash/FGD waste water in 1:1 ratio by means of the mixing apparatus used in the method according to the invention, then producing dense slurry by adding CaO, and finally depositing.

Additive: burnt gypsum CaO (dispensing dissolved CaOH into FGD waste water).

Type of Cl binding: puzzolanic.

Hereinafter, simplified chemical symbols will be used as follows: C=CaO, S=$SiO_2$, H=$H_2O$, A=$Al_2O_3$, F=$Fe_2O_3$, S*=$SO_3$.

Figure 7:
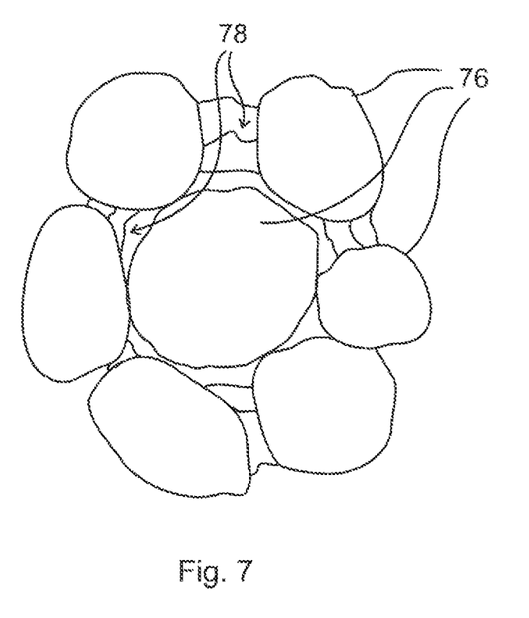
FIG. 7 is a schematic view of a dense slurry particle produced by means of the method according to the invention.

The chemical relationships for Cl binding are as follows:
a) $C_3A*CaCl_2*H_{10}$
b) $C_3F*CaCl_2*H_{10}$ $C_3A$ and $C_3F$ assume the arrangement as seen in FIG. 7 in the (silicate-based) glassy phase of a fly ash particle. Silicate-based fly ash particles 76 as illustrated in FIG. 7 are encased in a thin glass surface, which is formed by $C_3S$, $C_3A$, $C_3AF$, $C_3ACS$. The recesses between fly ash particles 76 contain alkaline (pH=11-12) waste water 78—preferably from a desulfurization process—containing $Ca(OH)_2$ as well.

For puzzolanic binding (for CSH crystallization), the fly ash from Hungarian power plants of a similar composition to that of Class F fly ash, has a binding capacity of a maximum of 100 g CaO/1000 g fly ash.

Chemical calculations have revealed that by dispensing CaO, the Ca ion surplus required for binding the $CaCl_2$ and $MgCl_2$ content of FGD can be adjusted.

This is carried out by the following examination steps:
determination of the puzzolanic binding capability of Class F fly ash, then
determination of optimum amount of additive, based on mixing experiments.

Due to technological or other factors the dry slag or dry bottom ash container or the wet slag container may be installed at a larger distance from the fly ash container. In such cases, dense slurry production from combustion residues is advisably carried out by means of two serially connected mixing apparatuses. The fly ash introduced into the first mixing apparatus is produced into a leaner fly ash slurry of density of e.g. 1.16 kg/$dm^3$, which is transferred into the second mixing apparatus by means of a lift pump, and by mixing it with the slag or bottom ash introduced into the second mixing apparatus via pressure increase, dense slurry of planned density is produced. After that, the dense slurry is transported by the output pump through the connected long-distance pipeline to the landfill area. Of course, slurry-free mixing water is added into the second mixing apparatus, as well.

The mixing apparatus used in the method according to the invention can be operated in an energy saving and very efficient manner to produce homogenous dense slurry. In the mixing apparatus, the slag and fly ash particles (the latter, when in slurry state is essentially the homogenized transport medium of slag particles) mix together during the mixing process at various points of the apparatus:
in the re-circulating pumps and pipelines,
in the re-circulated slurry inlet nozzles and by colliding into the cone surface located in the container through collisional destruction of the energy of speed of slurry jets exiting said nozzles,
finally, by acceleration of the speed vector of the centrifugal field within the bottom conical part of the container, as well as by vertical acceleration of the particles and by collision into the cone surface of the container.

The mixing apparatus used in the method according to the invention is a closed system apparatus with a gas or air suction system connectable to the mixing container (lower mixing space) thereof in order to provide a slight vacuum.

The mixing apparatus can be made abrasion resistant preferably by fitting the inner surfaces of the nozzles and the pipe system with rubber or with ceramic casing.

Self-cleaning of the mixing apparatus is facilitated by arranging the re-circulation inlet ports for ensuring tangential direction inlets (see FIG. 3). The adhesion of slurry is eliminated by the spiral slurry flow rotating in vertical direction on the inner surfaces.

The method according to the invention may be fitted to new as well as existing power plant technologies. For new power plants, it should be used in the following manner. At the recovery points, a major part of the combustion residue is available as a dry solid material containing coarse fly ash (so-called eco fly ash, air heater fly ash) as well as fine fly ash. Combustion residues from the fire space of powdered coal fired furnaces are generally too hot and too coarse, therefore they are usually cooled in slag firing rake water ponds and are ground prior to further transport. In case of fluid furnaces, the bottom ash is cooled in an ash cooler and then ground, if necessary.

Dry powder-like materials may also be pneumatically transported to the mixing apparatus used by the method according to the invention.

The invention is, of course, not limited to the preferred embodiments described in details above, but further variants, combinations, modifications and developments are possible within the scope determined by the claims.

The invention claimed is:

1. A method for producing a mixture of powder or granular state material and liquid, comprising:
producing a first mixture by conveying the powder or granular state material through an inlet hopper into an upper mixing space and by feeding the liquid into the upper mixing space,
introducing the first mixture into a lower mixing space through a conducting pipe connecting a bottom part of the upper mixing space and an upper part of a lower mixing space, the lower mixing space having a cylindrical space portion and a conical space portion, and producing a second mixture by causing it to collide into a baffle member,
discharging the second mixture through the conical space portion arranged at a bottom part of the lower mixing space, and by dividing the mixture
discharging a first mixture portion as a mixture material,
re-circulating a second mixture portion into the upper mixing space, and
conveying a third mixture portion into the upper part of the lower mixing space, the third mixture portion being introduced into the upper part of the lower mixing space in a tangential direction causing a rotational movement of the second mixture in the lower mixing space,
wherein
the ratio of the first mixture portion and the second mixture portion is chosen to a value between 1:1 and 1:4, while the ratio of the first mixture portion and the third mixture portion is chosen to a value between 1:1 and 1:5,
in the lower mixing space the amount of the second mixture is adjusted so that a parabolic surface of the second mixture is
within the cylindrical space portion of the lower mixing space, including the lowest point of the parabolic surface, and is
spaced from the baffle member, and measurement of the lowest point of the parabolic surface is carried out by means of at least one pressure gauge arranged in a sidewall of the cylindrical space portion.

2. The method according to claim 1, characterized in that the ratio of the first mixture portion and the second mixture portion is chosen to a value between 1:1.5 and 1:3, and the ratio of the first mixture portion and the third mixture portion is chosen to a value between 1:2 and 1:4.

3. The method according to claim 1, characterized in that, the liquid is introduced into the upper mixing space in a tangential direction.

4. The method according to claim 1, characterized in that a lowest of the at least one pressure gauge is located above the conical space portion by a maximum of 150 mm.

5. The method according to claim 1, characterized in that a pressure gauge arranged in a rubber sleeve is used.

6. The method according to claim 1, characterized in that fly ash is used as powder or granular state material and the fly ash is fed from a fly ash silo.

7. The method according to claim 6, characterized in that fly ash has a dry fly ash content of at least 70 wt %.

8. The method according to claim 1, characterized in that slag slurry is fed into the upper mixing space as well.

9. The method according to claim 1, characterized in that a powder or granular state material is used with a gypsum content of a maximum of 20 wt %.

10. The method according to claim 2, characterized in that the ratio of the first mixture portion and the second mixture portion is approximately 1:2.

11. The method according to claim 2, characterized in that the ratio of the first mixture portion and the third mixture portion is approximately 1:3.

* * * * *